United States Patent Office 3,829,344
Patented Aug. 13, 1974

3,829,344
MACHINE FOR PRODUCING NONWOVEN
FLOOR COVERINGS
Stoyan Iliev Julev, Mihail Yordanov Milkov, Lyubomir Petrov Dachev, Rosen Petrov Vasilev, Vasil Alexandrov Kostov, and Jacky Sivcho Aroyo, Sofia, Bulgaria, assignors to DSO "Textil," Sofia, Bulgaria
Filed Mar. 2, 1973, Ser. No. 337,694
Int. Cl. D04h 11/08; B31f 1/20
U.S. Cl. 156—435                    19 Claims

ABSTRACT OF THE DISCLOSURE

A machine for making nonwoven floor coverings. A felt layer is rammed into grooves, formed in a drum, by a "flying" ramming tool moving to follow each groove, the ramming tool being driven by crank mechanism, the guide of this mechanism being a connecting rod hinged parallelogram. The drum is continuously turned over by two opposite cogs rigidly connected with the ramming tool by a frame which moves therewith. The felt with the folds on the drum is adhered by a binding substance, which is cured or dried on the drum surface.

---

The present invention relates to a machine for producing nonwoven floor coverings, in which a felt layer is rammed into grooves, dormed upon a drum, by a ramming tool driven by crank mechanism, the guide for this mechanism being the connecting rod of a hinged parallelogram. The drum is continuously turned over by two opposite cogs which are rigidly connected with the ramming tool by a frame. The felt folded upon the drum is adhered by a substance which is dried on the drum surface.

Machines for producing nonwoven floor coverings are known in which the ramming tool is driven by camshaft gear or by link gear. The turning of the drum is effected in these machines by a chain transmission or by a gear transmission, said transmissions being disposed between the main shaft and the drum shaft. This is a substantial disadvantage of the prior known machine designs because of the unreliable synchronization between the ramming tool motion and the drum turning due to the very high ratio between the driving and driven speeds of the transmission.

The turning of the drum by means of ratchet gearing, employed in certain prior machine designs, entails undesirable shock effects, the discontinuous character of the driven motion seriously disadvantageously affecting the production process. The use of a camshaft gear for driving of the ramming tool results in low mechanical efficiency and limited productivity due to impossibility of balancing inertial forces.

The invention has among its objects the provision of a machine for producing nonwoven floor coverings by ramming felt into grooves formed upon a drum, in which the ramming tool is driven by a toggle mechanism and the ramming tool drives the drum continuously, the application of gearing or any other additional transmission being unnecessary.

This result is realized by rigidly connecting the ramming tool with a frame to which, at a distance equal to the diameter of the outer drum, two cogs are fastened. The frame slides over a guide rod which moves translatorily along a circle having a diameter equal to one-half the pitch of the grooves in the drum. The guide rod is connected with the main shaft of the machine by a hinged joint and is connected with an auxiliary crankshaft by a slide block. The main crankshaft throws and the auxiliary crankshaft throws are parallel, both of them being equally long, their lengths being equal to a quarter of a pitch of the grooves upon the drum. The parallelism between the throws of the crankshaft is effected by a chain and two identical sprockets mounted on the main crankshaft and on the auxiliary crankshaft. Thus, the guide rod together with the main and auxiliary crank throws form a hinged parallelogram.

The frame motion lengthwise of the guide rod is determined by a connecting rod coupled with the frame by a hinged joint. The other end of this guide rod is connected with the main shaft by a hinged joint located along the prolongation of the hinged parallelogram throw at a distance from the axis of the main shaft which is equal to one-half the vertical stroke of the ramming tool. Every point on the frame of the mechanism thus formed, as well as the upper and lower points of the cogs, have trajectories close to ellipses, the major axis of these ellipses being equal to the stroke of the ramming tool, and their minor axes being equal to one-half the pitch of the grooves in the drum. The upper and lower cogs are mounted on the frame in such a way that their axes are concurrent with the axis of the guide rod, the cogs having their points directed towards the axis of the drum axis, the distance between the cogs being equal to the outer diameter of the drum. During the movement of the frame the cogs enter into second grooves, cut upon the flanges of the drum, the number of the second grooves being equal to the number of the first grooves upon the peripheral surface of the drum. The outer diameter of the flange is a bit larger than that of the drum itself. The depth of the second (flange) grooves is a bit larger than one-half of the stroke of the ramming tool. The upper and lower cogs enter successively into the second (flange) grooves, thus turning the drum through one pitch for each period of motion of the frame. An important feature of this mechanism is that the drum turns both during the ramming of the felt into a first groove on the drum, and during the reverse stroke of the ramming tool.

Counterweights are fixed on the opposite sides of the throws of the main and auxiliary crankshafts as well as on the connecting rod; by means of these counterweights, full balancing of the inertial forces is achieved within the felt ramming and drum turning mechanism. It will be seen from the above that the ramming tool has a "flying" motion, that is, it enters a groove in the drum, moves laterally with the groove on the drum, and leaves the groove all while the drum is turning.

The nonwoven floor covering production is carried out entirely on the drum. The felt is supplied as a layer to the ramming zone by a pair of feeding rollers. The felt is rammed into the drum grooves by a ramming tool. In order to prevent the folds already formed in the felt from getting out of the grooves, several of the last folds are clamped on the drum by a clamping tool. This tool is connected by a sliding joint with the guide rod, and is connected with the frame by a main spring. After touching the folds the clamping tool remains motionless with relation to the drum on account of the deformation of the main spring. The felt rammed into the first grooves on the drum is impregnated with a binding substance; the binding substance is dried by means of infrared heaters past which the drum rotates. The finished floor covering is detached from the drum by means of drawing out rollers, the first one of such rollers being forcibly cooled.

The main advantages of the machine of the invention for producing nonwoven floor coverings results from unification of the ramming tool motion with the turning of the drum. Thus, exact synchronization is secured between these two motions, for they are produced by one and the same mechanism. The shockless operation of the machine and the full balancing of inertial forces by the mechanism permit the attainment of a high frequency ramming process.

The machine according to this invention is hereinafter particulary described with reference to the accompanying drawings, in which:

FIG. 1 presents an isometric diagram of the felt ramming and drum turning mechanism of the illustrative embodiment of the machine in accordance with the invention;

Figure 1:
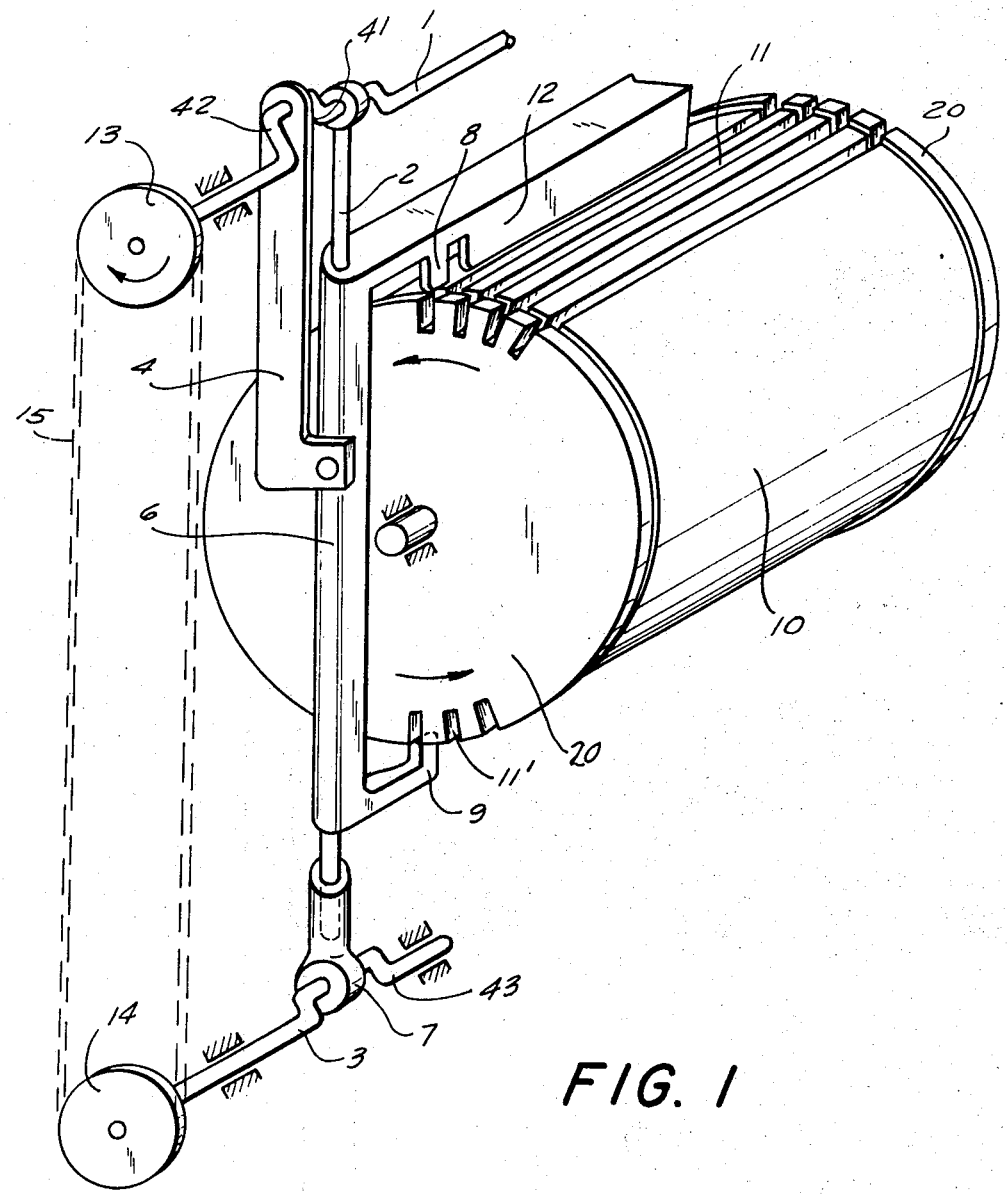

The machine has a main crankshaft 1 which is driven by an electric motor (not shown). An auxiliary crankshaft 3 is driven by means of sprockets 13 and 14 and a chain 15 entrained thereover. Shaft 3 has angular speed equal to that one of the main shaft 1. The two identical crank throws 41 of shaft 1 and the two identical throws 43 of shaft 3 together with the respective guides 2 and connecting links 7 form two identical spaced hinged parallelograms. Parallelism between crank throws 41 and 43 is provided by the sprockets 13 and 14 and the chain 15. A lengthwise sliding of guide 2 by means of a socket on the connecting link 7 is provided in order to avoid errors of turning of the auxiliary shaft 3 caused by inaccuracies of production and assembly and also to permit thermal elongations of the guide 2.

A large crank throw 42 is provided on the main crankshaft 1; throw 42 lies in the plane of the small crank throw 41. Crank throw 42 is connected by a hinged joint with a connecting rod 4. The connecting rod 4 drives a slide block, which slides over the guide rod 2 together with a frame 6. The frame 6 is rigidly connected with a ramming tool 12, tool 12 having an upper cog 8 and a lower cog 9, and being driven in a motion of translation. The points of cogs 8 and 9 have equally curved trajectories, which are close to ellipses with a major axis equal to the eccentricity of the large crank throw 42, and a minor semiaxis equal to the eccentricity of the small crank throws 41 and 43.

Figure 2:
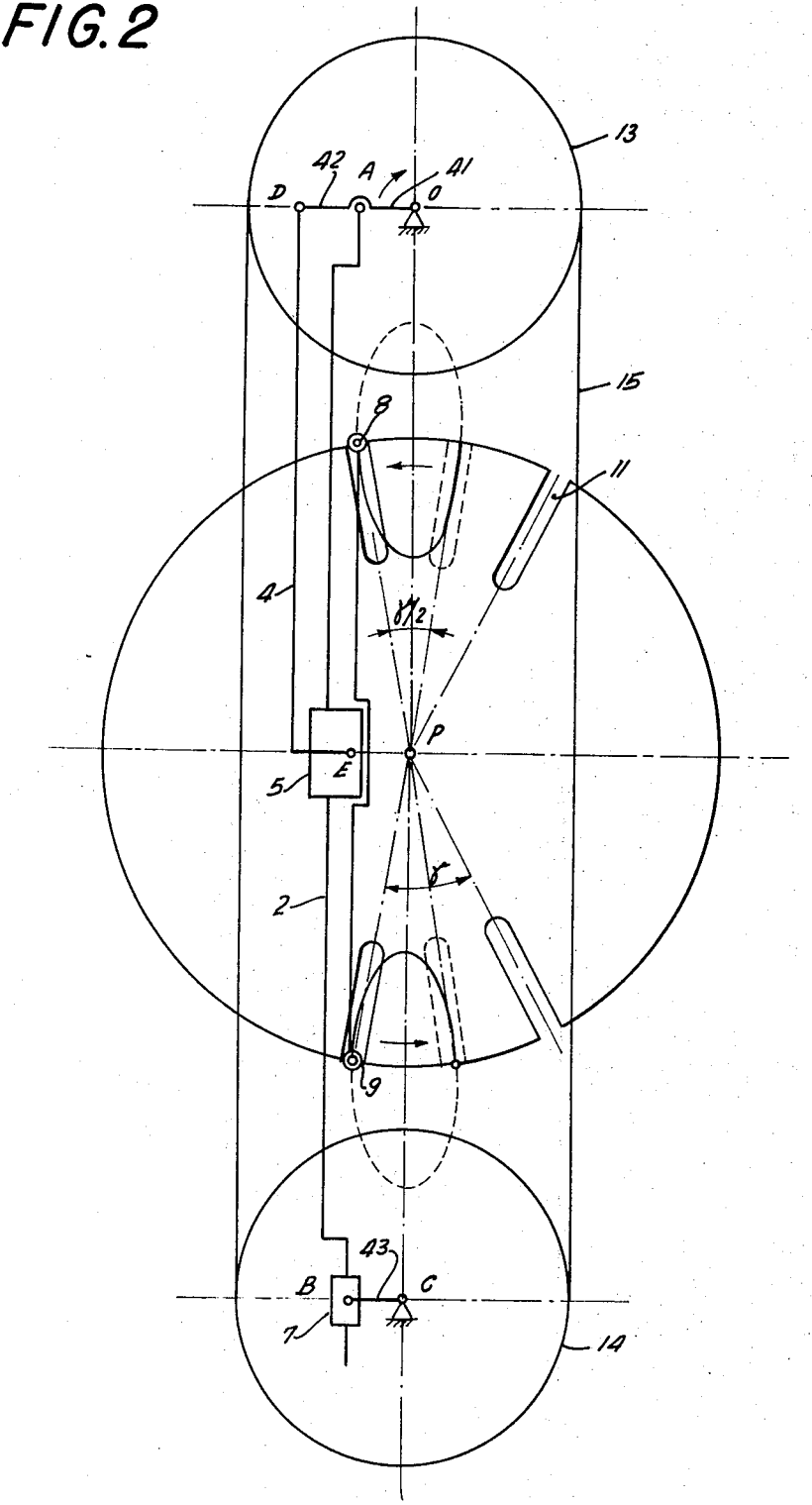
FIG. 2 is a schematic diagram of this mechanism with respect to its functions.
Figure 3:
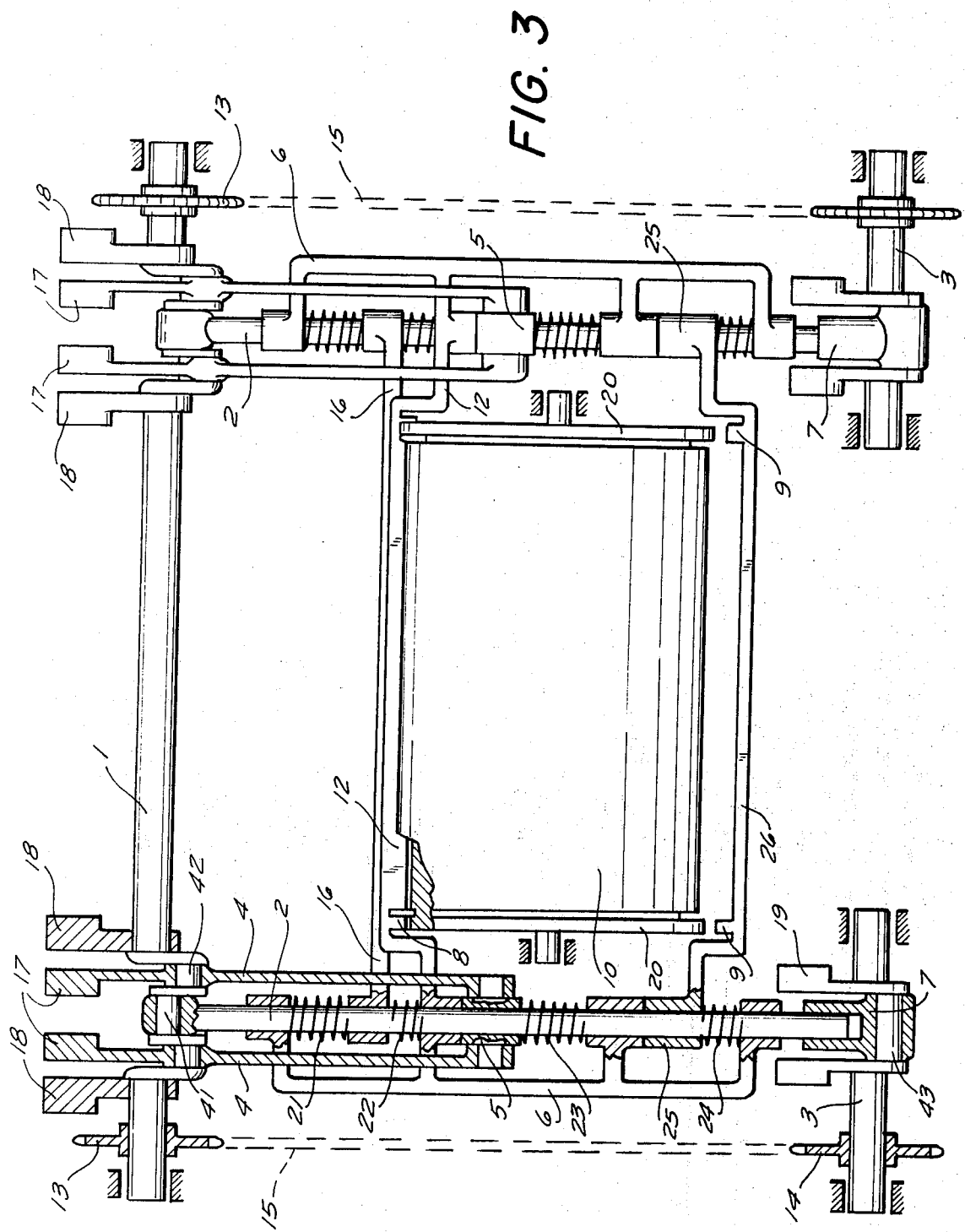
FIG. 3 is a view in section of an actual embodiment of the machine, the view showing the drum together with the felt ramming and the drum turning mechanism, the view also showing the drive for the clamping means and the mechanism for balancing the inertial forces.

Upon the drum 10, which is supported for idle rotation by stub shafts and bearings, as shown, as well as upon end flanges 20 on the drum at an angular spacing or pitch γ there are cut an uneven number of grooves 11, 11', respectively. The outer diameter of flanges 20 is a bit larger than that of the drum 10. The driving of the drum 10 in the direction of the arrows is effected by cogs 8 and 9 fixedly connected to frame 6 reciprocating along the axes of guide rods 2, the distance between the points of these two cogs 8, 9 being equal to the outer diameter of drum 10. During the forming of the stuffed ribs or "stitches" in the felt, cog 8 enters into groove 11' of flange 20 and rotates the drum 10 through half an angular pitch γ/2 in a direction opposite to the direction of rotation of main crankshaft 1. When cogs 8 escape from the respective groove 11', at the same time at the opposite side of flanges 20 the cogs 9 enter into respective groove 11' which form an angle γ/2 with the first grooves 11', and rotate the drum 10 in the same direction, also through an angle γ/2. The operation part of the point trajectories of cogs 8 and 9 is shown in FIG. 2 as a full line. The angular speed of drum 10 is instantly brought to zero at the positions of alternation of the driving cogs. At certain points in the cycle, cogs 8 and 9 simultaneously lie in grooves 11'. This does not lead to jamming of the machine since for the positions considered the difference between the trajectories of the points of cogs 8 and 9 and their tangents is smaller than the clearance between cogs 8 and 9 and grooves 11'. The overlapping of the operating sectors of the trajectories of cogs 8 and 9 is necessary in order to provide security of the drum 10 against accidental turning during alternation of one of said driving cogs. It will be seen that the cogs 8 and 9 and the grooves 11' in a flange 20 constitute an escapement which drives the drum from the frame.

It is possible for drum 10 and flanges 20 to possess an even number of grooves. In such embodiment, which is unillustrated, the axis of the drum 10 is displaced in relation to the plane defined by the axes of the main shaft 1 and the auxiliary shaft 3 by a distance equal to the eccentricity of the small crank throw 41.

Figure 4:
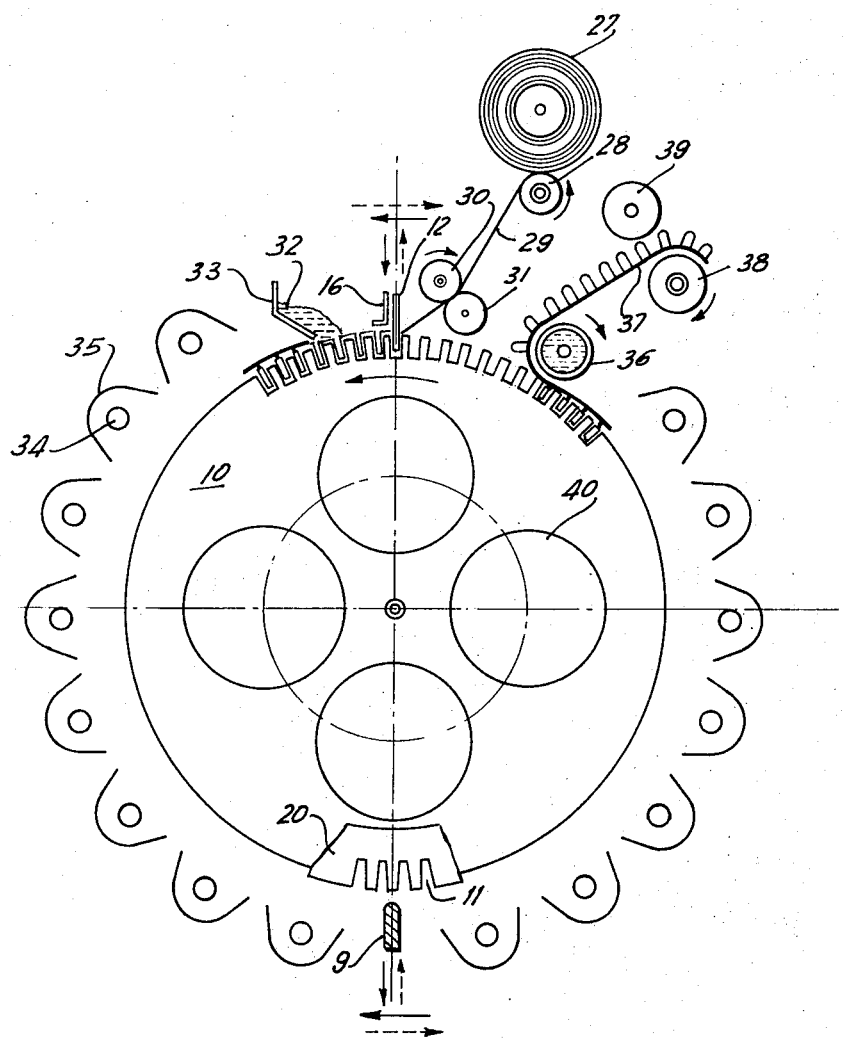
FIG. 4 is a general diagrammatic view in end elevation of the machine for producing nonwoven floor coverings.

A non-woven floor covering 37 is produced on the surface of drum 10. A sheet of felt 29 is unrolled from a felt roll 27 (FIG. 4) by an unrolling roller 28. A pair of feeding rollers 30 and 31 supply felt to the ramming zone on the drum. The ramming tool 12, which spans the drum 10 and is parallel to the axis thereof, is rigidly connected to the frame 6, which is joined to slide blocks 5 by respective preliminarily tightened coil compression restraining springs 23. The latter protect drum 10, flange 20, ramming tool 12 and cog 8 against damages in cases when cog 8 and tool 12 cannot enter into the respective grooves 11, 11. The protective springs 23 also limit the maximum force of ramming the felt 29 into grooves 11. Preliminarily tightened additional springs 24 provide flexible couplings between the frame 6 and the bushings 25, which through a bar 26 carry the lower cogs 9. The purpose of the additional springs 24 is to protect the flanges 20 and the lower cogs 9 against damages if the last one would not enter into the respective groove 11'. A clamping tool 16 (FIG. 4) is connected by slip joints with guide rods 2, and by preliminary tightened main springs 21 and buffer springs 22 with frame 6.

The purpose of the clamping tool 16 is to protect the already formed stuffings or "stiches" against damage when the ramming tool 12 is entering into and escaping from grooves 11. The clamping tool 16 moves together with the ramming tool 12 until the tool 16 clamps to drum 10, those several last stitches positioned most closely to that groove in which the ramming tool 12 is instantaneously forming a new stitch. Later, the clamping tool 16 remains immovable in relation to the drum 10 because of the deformation of the main springs 21. After the new stitch is formed and the ramming tool 12 starts to move radially out of the groove 11, the clamping tool 16 is accelerated in its radially outward movement by the buffer springs 22, and further on both tools 12 and 16 move simultaneously.

The inertial forces of the felt ramming and drum turning mechanism 10 are fully balanced by means of counterweights 17 mounted on the connecting rod 4, counterweights 13 on the main shaft 1, and counterweights 19 on the auxiliary shaft 3.

As described above, all mechanisms and elements heretofore enumerated and described are disposed symmetrically at both ends of drum 10.

The felt rammed into the grooves 11 of drum 10 is impregnated with a binding substance 32, such substance being spread by means of a doctor blade 33. The remainder of the adjacent cylindrical surface of drum 10 is utilized for drying the formed felt by infrared heaters 34, the thermal flow from such heaters being directed towards the surface being dried by reflectors 35. The finished floor covering 37 is detached from drum 10 by means of drawing out rollers 36 and 38 which are disposed close to and in advance of the feeding rolls 30, 31. The first drawing out roller 36 is forcibly cooled, a liquid coolant circulating in its inner space for that purpose. The finished floor covering 37 is drawn out by the second drawing roller 38 and a confronting pressure roller 39. The unrolling roller 28, the feeding roller 30, and the drawing out rollers 36 and 38 are driven by the main shaft 1 through gears and chain drives (not shown). The drive of the drawing out rollers 36 and 38 is effected through a safety slip clutch which yields when subjected to a predetermined torque, in order to provide a permanent drawing out force.

Although the invention is illustrated and described with reference to a plurality of preferred embodiments thereof, it is to be expressly understood that it is in no way limited to the disclosure of such preferred embodiments, but is capable of numerous modifications within the scope of the appended claims.

What is claimed is:

1. In a machine adapted for the production of a nonwoven ribbed floor covering from a sheet of felt, said machine having a cylindical drum rotatable about its axis and having a plurality of radially cut, axially extending grooves cut into the periphery of the drum, means to feed a sheet of felt onto the surface of the drum, an elongated ramming tool which is presented to the sheet of felt overlying each groove and thrusts the felt which it engages radially inwardly into the groove to form a rib and is thereafter withdrawn from such groove and presented to the following groove, the improvement which comprises a frame mounting the ramming tool, means supporting and driving the frame and the ramming tool with generally continuous movement in elongated closed convex curves in a plane disposed at a right angle to the axis of the drum, and means for generally continuously rotating the drum by and in synchronism with the motion of the frame.

2. A machine according to claim 1, wherein the means driving the drum from the frame comprises an escapement means having cooperating parts affixed respectively to the frame and the drum.

3. A machine according to claim 1, wherein the paths of movement of the frame and ramming tool are generally in the form of ellipses.

4. A machine according to claim 1, wherein the means supporting and driving the frame and the ramming tool comprises first and second crankshafts disposed on opposite sides of the drum and parallel to the axis thereof, similar and similarly angularly oriented first and second cranks disposed in alignment on the first and second crankshafts, means drivingly interconnecting the two crankshafts for rotation in synchronism, means for driving said crankshafts, a guide rod extending between and pivotally connected to the crank pins of the first and second cranks, means mounting the frame for sliding movement along the guide rod, and means driving the frame mounting means for reciprocation along the guide rod in synchronism with the rotation of the crankshafts.

5. A machine according to claim 4, wherein the means driving the frame mounting means on the guide rod comprises a third crank, said third crank being affixed to one of said first and second crankshafts.

6. A machine according to claim 5, wherein the throw of the third crank lies in the same radial axial plane as the throw of the other crank on the crankshaft mounting the third crank.

7. A machine as claimed in claim 4, wherein the eccentricity of the first and second cranks is equal to a quarter of the pitch of the grooves on the drum.

8. A machine according to claim 4, wherein the eccentricity of the throw of the third crank is equal to one-half the stroke of the ramming tool.

9. A machine as claimed in claim 2, wherein the part of the escapement means affixed to the drum comprises a disc affixed to one end of the drum coaxial thereof, the disc being provided with radial slots which are spaced apart at an angle equal to the angle between successive grooves in the drum, and wherein the part of the escapement means affixed to the frame comprises opposed cogs which are alternately received in spaced slots in the disc.

10. A machine as claimed in claim 9, wherein the diameter of the disc is larger than the diameter of the drum.

11. A machine as claimed in claim 10, wherein the radial depth of the slots in the disc is larger than the eccentricity of the throw of the third crank.

12. A machine as claimed in claim 9, wherein the cogs are disposed in a plane parallel to the axis of the drum and containing the axis of the guide rod.

13. A machine for producing nonwoven floor coverings, as claimed in claim 1, wherein the distance between the confronting ends of the cogs is equal to the outer diameter of the drum.

14. A machine as claimed in claim 1, wherein the number of grooves on the drum is odd, and the axes of rotation of the first and second crankshafts and the axis of the drum lie in the same plane.

15. A machine as claimed in claim 1, wherein the number of grooves on the drum is even, the axis of rotation of the drum is displaced by a distance equal to the eccentricity of the first and second small crank throws in relation to the plane defined by the axes of rotation of the first and second crankshafts.

16. A machine as claimed in claim 4, wherein the means mounting the frame for sliding movement along the guide rod comprises a yoke having axially spaced arms through which the guide rod extends and which guide the frame on the guide rod, and the means driving the frame mounting means comprises a slide block on the guide rod between the arms of the yoke, and a coil compression spring telescoped about the guide rod and interposed between the slide block and that arm of the yoke remote from the first crankshaft.

17. A machine according to claim 1, comprising an elongated clamping tool extending along the length of the drum immediately downstream of the ramming tool, and means for yieldingly applying the clamping tool to the stuffed felt formations simultaneously with the insertion of the ramming tool into a groove in the drum.

18. A machine as claimed in claim 17, comprising means including a doctor blade for spreading a binding substance over the folded felt immediately downstream of the clamping tool.

19. A machine as claimed in claim 18, comprising means for curing the binding substance in the folded felt as it travels around on the drum, and means for continuously removing the folded felt product impregnated with cured binding material from the drum upstream of the ramming tool.

References Cited
UNITED STATES PATENTS

| | | | |
|---|---|---|---|
| 3,173,823 | 3/1965 | Guinard | 156—435 |
| 3,309,252 | 3/1965 | Adler | 156—72 |
| 3,701,700 | 10/1972 | Von Der Heide | 156—210 |
| 1,009,365 | 11/1911 | Wirt | 156—474 |
| 3,157,554 | 11/1964 | Beasley | 156—474 |
| 2,116,048 | 5/1938 | Smith | 156—435 |
| 3,542,625 | 11/1970 | Vernier | 156—205 |
| 2,793,674 | 5/1957 | Reinhard | 156—72 |

CLIFTON B. COSBY, Primary Examiner

J. E. KITTLE, Assistant Examiner

U.S. Cl. X.R.
156—72, 205, 210, 474; 74—128, 142